US006901481B2

(12) United States Patent  (10) Patent No.: US 6,901,481 B2
Olson  (45) Date of Patent: May 31, 2005

(54) METHOD AND APPARATUS FOR STORING TRANSACTIONAL INFORMATION IN PERSISTENT MEMORY

(75) Inventor: Thomas Olson, Westborough, MA (US)

(73) Assignee: Stratus Technologies Bermuda Ltd., Hamilton (BM)

( * ) Notice: Subject to any disclaimer, the term of this patent is extended or adjusted under 35 U.S.C. 154(b) by 475 days.

(21) Appl. No.: 09/790,750

(22) Filed: Feb. 22, 2001

(65) Prior Publication Data

US 2001/0032300 A1 Oct. 18, 2001

Related U.S. Application Data

(63) Continuation-in-part of application No. 09/550,108, filed on Apr. 14, 2000.

(51) Int. Cl.[7] .............................................. G06F 12/06
(52) U.S. Cl. ............................ 711/129; 711/173; 713/1
(58) Field of Search ................................ 711/129, 170, 711/173, 172, 163, 154, 152, 123, 125, 126; 713/1, 2, 100; 703/24

(56) References Cited

U.S. PATENT DOCUMENTS

| 3,460,094 A | 8/1969 | Pryor et al. ............... 340/172.5 |
| 3,544,973 A | 12/1970 | Borck et al. ............. 340/172.5 |
| 3,548,382 A | 12/1970 | Lichty et al. ............ 340/172.5 |
| 3,609,704 A | 9/1971 | Shurter .................... 340/172.5 |
| 3,641,505 A | 2/1972 | Artz et al. ............... 340/172.5 |

(Continued)

FOREIGN PATENT DOCUMENTS

| EP | 0 208 430 | 1/1987 | .................. 13/32 |
| EP | 0 428 330 A3 | 5/1991 | .................. 13/30 |
| EP | 0 406 759 A3 | 9/1991 | .................. 12/56 |
| EP | 0 483 978 A2 * | 5/1992 | ............ G07F/7/12 |
| EP | 0 488 366 A2 | 6/1992 | .......... G11C/16/06 |
| EP | 0 642079 A1 | 3/1995 | .......... G06F/11/14 |
| EP | 0 475 005 B1 | 11/1995 | .................. 15/16 |
| EP | 0 772136 A3 | 5/1997 | .......... G06F/17/00 |
| EP | 0 772136 A2 | 5/1997 | .......... G06F/17/00 |
| EP | 0 790 558 A1 | 8/1997 | .................. 11/14 |
| EP | 0 390 567 B1 | 6/1999 | .................. 29/6 |
| WO | 95/12848 | 5/1995 | .......... G06F/11/00 |

OTHER PUBLICATIONS

Form PCT/ISA/210, International Search Report for International Application No. PCT/US01/12138, mailed on Mar. 26, 2002.
"Dynamic Scatter Gather Table", Aug., 1990, (pp. 1–2), IBM Technical Disclosure Bulletin.
Annex to Form PCT/ISA/206 Communication Relating to the Results of the Partial International Search to International Application No.: PCT/US 01/12138 mailed on Nov. 27, 2000.

*Primary Examiner*—Pierre-Michel Bataille
(74) *Attorney, Agent, or Firm*—Lahive & Cockfield, LLP; John D. Lanza, Esq.

(57) ABSTRACT

A method and apparatus for storing transactional information in persistent memory. In one embodiment, the invention features a persistent volatile memory and an intermediary program in communication with the persistent volatile memory. The intermediary program receives transactional information and stores the information in the persistent volatile memory. A computer uses the intermediary program to enable the contents of the persistent volatile memory to remain unaltered during a failure of the computer. Additionally, the intermediary program may determine whether the transactional information meets a predetermined criteria before storing the information in the persistent volatile memory.

23 Claims, 6 Drawing Sheets

U.S. PATENT DOCUMENTS

| | | | |
|---|---|---|---|
| 3,705,388 A | 12/1972 | Nishimoto | 340/172.5 |
| 3,710,324 A | 1/1973 | Cohen et al. | 340/172.5 |
| 3,736,566 A | 5/1973 | Anderson et al. | 340/172.5 |
| 3,795,901 A | 3/1974 | Boehm et al. | 340/172.5 |
| 3,805,039 A | 4/1974 | Stiffler | 235/153 |
| 3,893,084 A | 7/1975 | Kotok et al. | 340/172.5 |
| 4,164,787 A | 8/1979 | Aranguren | 364/200 |
| 4,228,496 A | 10/1980 | Katzman et al. | 364/200 |
| 4,356,550 A | 10/1982 | Katzman et al. | 364/200 |
| 4,365,295 A | 12/1982 | Katzman et al. | 364/200 |
| 4,366,535 A | 12/1982 | Cedolin et al. | 364/200 |
| 4,466,098 A | 8/1984 | Southard | 371/9 |
| 4,484,273 A | 11/1984 | Stiffler et al. | 364/200 |
| 4,562,575 A | 12/1985 | Townsend | 371/9 |
| 4,589,066 A | 5/1986 | Lam et al. | 364/200 |
| 4,622,667 A | 11/1986 | Yount | 371/9 |
| 4,648,031 A | 3/1987 | Jenner | 364/200 |
| 4,695,975 A | 9/1987 | Bedrij | 364/900 |
| 4,700,292 A | 10/1987 | Campanini | 364/200 |
| 4,716,523 A | 12/1987 | Burrus, Jr. et al. | 364/200 |
| 4,774,659 A | 9/1988 | Smith et al. | 364/200 |
| 4,866,604 A | 9/1989 | Reid | 364/200 |
| 4,924,427 A | 5/1990 | Savage et al. | 364/900 |
| 4,942,517 A | 7/1990 | Cok | 364/200 |
| 4,942,519 A | 7/1990 | Nakayama | 364/200 |
| 4,965,717 A | 10/1990 | Cutts, Jr. et al. | 364/200 |
| 4,993,030 A | 2/1991 | Krakauer et al. | 371/40.1 |
| 5,115,490 A | 5/1992 | Komuro et al. | 395/400 |
| 5,155,809 A | 10/1992 | Baker et al. | 395/200 |
| 5,157,663 A | 10/1992 | Major et al. | 371/9.1 |
| 5,175,855 A | 12/1992 | Putnam et al. | 395/700 |
| 5,193,162 A | 3/1993 | Bordsen et al. | 395/425 |
| 5,193,180 A | 3/1993 | Hastings | 395/575 |
| 5,195,040 A | 3/1993 | Goldsmith | 364/443 |
| 5,231,640 A | 7/1993 | Hanson et al. | 371/68.3 |
| 5,276,860 A | 1/1994 | Fortier et al. | 395/575 |
| 5,280,612 A | 1/1994 | Lorie et al. | 395/600 |
| 5,280,619 A | 1/1994 | Wang | 395/725 |
| 5,295,258 A | 3/1994 | Jewett et al. | 395/575 |
| 5,317,726 A | 5/1994 | Horst | 395/575 |
| 5,321,706 A | 6/1994 | Holm et al. | 371/51.1 |
| 5,333,265 A | 7/1994 | Orimo et al. | 395/200 |
| 5,335,334 A | 8/1994 | Takahashi et al. | 395/425 |
| 5,357,612 A | 10/1994 | Alaiwan | 395/200 |
| 5,386,524 A | 1/1995 | Lary et al. | 395/400 |
| 5,404,361 A | 4/1995 | Casorso et al. | 371/40.1 |
| 5,423,037 A | 6/1995 | Hvasshovd | 395/600 |
| 5,423,046 A | 6/1995 | Nunnelley et al. | 395/750 |
| 5,426,747 A | 6/1995 | Weinreb et al. | 395/400 |
| 5,440,727 A | 8/1995 | Bhide et al. | 395/444 |
| 5,440,732 A | 8/1995 | Lomet et al. | 395/600 |
| 5,463,755 A | 10/1995 | Dumarot et al. | 395/475 |
| 5,465,328 A | 11/1995 | Dievendorff et al. | 395/182.13 |
| 5,475,860 A | 12/1995 | Ellison et al. | 395/846 |
| 5,497,476 A | 3/1996 | Oldfield et al. | 395/439 |
| 5,504,873 A | 4/1996 | Martin et al. | 395/438 |
| 5,513,314 A | 4/1996 | Kandasamy et al. | 395/182.04 |
| 5,550,986 A | 8/1996 | DuLac | 395/280 |
| 5,555,404 A | 9/1996 | Torbjørnsen et al. | 395/600 |
| 5,557,770 A | 9/1996 | Bhide et al. | 295/488 |
| 5,566,316 A | 10/1996 | Fechner et al. | 395/441 |
| 5,568,629 A | 10/1996 | Gentry et al. | 395/441 |
| 5,581,750 A | 12/1996 | Haderle et al. | 395/618 |
| 5,584,008 A | 12/1996 | Shinada et al. | 395/441 |
| 5,584,018 A | 12/1996 | Kamiyama | 395/492 |
| 5,586,253 A | 12/1996 | Green et al. | 395/411 |
| 5,586,310 A | 12/1996 | Sharman | 395/600 |
| 5,627,961 A | 5/1997 | Sharman | 395/182.04 |
| 5,632,031 A | 5/1997 | Velissaropoulos et al. | 395/611 |
| 5,664,172 A | 9/1997 | Antoshenkov | 395/604 |
| 5,682,513 A | 10/1997 | Candelaria et al. | 395/440 |
| 5,687,392 A | 11/1997 | Radko | 395/842 |
| 5,694,583 A | 12/1997 | Williams et al. | 395/500 |
| 5,721,918 A | 2/1998 | Nilsson et al. | 395/618 |
| 5,724,581 A | 3/1998 | Kozakura | 395/618 |
| 5,794,035 A | 8/1998 | Golub et al. | 395/674 |
| 5,794,252 A | 8/1998 | Bailey et al. | 707/202 |
| 5,799,324 A * | 8/1998 | McNutt et al. | 707/200 |
| 5,815,649 A | 9/1998 | Utter et al. | 395/112.04 |
| 5,838,899 A | 11/1998 | Leavitt et al. | 395/185.09 |
| 5,862,145 A | 1/1999 | Grossman et al. | 371/5.1 |
| 5,892,928 A | 4/1999 | Wallach et al. | 395/283 |
| 5,894,560 A | 4/1999 | Carmichael et al. | 395/845 |
| 5,918,229 A | 6/1999 | Davis et al. | 707/10 |
| 5,933,838 A | 8/1999 | Lomet | 707/202 |
| 5,953,538 A | 9/1999 | Duncan et al. | 395/842 |
| 5,953,742 A | 9/1999 | Williams | 711/154 |
| 5,956,756 A | 9/1999 | Khalidi et al. | 711/207 |
| 5,990,914 A | 11/1999 | Horan et al. | 345/521 |
| 6,012,106 A | 1/2000 | Schumann et al. | 710/22 |
| 6,012,120 A | 1/2000 | Duncan et al. | 710/22 |
| 6,021,456 A | 2/2000 | Herdeg et al. | 710/260 |
| 6,032,227 A * | 2/2000 | Shaheen et al. | 711/129 |
| 6,047,343 A | 4/2000 | Olarig | 710/102 |
| 6,065,017 A | 5/2000 | Barker | 707/202 |
| 6,067,550 A | 5/2000 | Lomet | 707/202 |
| 6,085,200 A | 7/2000 | Hill et al. | 707/202 |
| 6,098,137 A | 8/2000 | Goodrum et al. | 710/129 |
| 6,105,075 A | 8/2000 | Ghaffari | 710/5 |
| 6,119,128 A | 9/2000 | Courter et al. | 707/202 |
| 6,128,711 A | 10/2000 | Duncan et al. | 711/155 |
| 6,138,198 A | 10/2000 | Garnett et al. | 710/129 |
| 6,141,722 A | 10/2000 | Parsons | 711/2 |
| 6,141,744 A | 10/2000 | Wing So | 712/35 |
| 6,542,967 B1 * | 4/2003 | Major | 711/134 |

\* cited by examiner

METHOD AND APPARATUS FOR STORING TRANSACTIONAL INFORMATION IN PERSISTENT MEMORY

CROSS-REFERENCE TO RELATED APPLICATIONS

This application is a continuation-in-part of U.S. patent application Ser. No. 09/550,108, filed Apr. 14, 2000, the entire disclosure which is incorporated by reference herein.

FIELD OF THE INVENTION

The invention relates generally to storing information and more specifically to storing transactional information in persistent memory on a computer.

BACKGROUND OF THE INVENTION

Information accessed by a computer system is often preserved for later retrieval by the computer system. In some circumstances, a computer system prevents access to a particular file stored on a disk when writing information (e.g., transactional information) to that file until such writing completes. This occurs to avoid corrupted transactions. For example, a database management system (DBMS) generally requires that all updates to files stored in non-volatile storage (e.g., a disk) are completed before that file is made available for access by an application.

In particular, a "database commit" is the final step in the successful completion of an update to a file made as a part of handling a transaction. For example, when a single transaction includes several steps, then all of the steps must be completed before the transaction is deemed successful and the database file is actually changed to reflect the transaction. When a transaction completes successfully, the changes to the file are said to be "committed".

Since a read or write transaction requires a read from or a write to non-volatile storage (e.g., disk) and access to the disk is limited until the previous transaction is committed, access to the database file is slowed by the delays in committing the data. Consequently, the performance of the DBMS decreases.

One prior art solution to this problem is to store the information in a temporary log file in volatile cache memory so that the DBMS can commit the information to disk at a later time. Further, the performance decrease of the computer system when writing the information is typically reduced when the information is first written to the log file rather than non-volatile storage (e.g., disk). However, if the computer system failures (i.e., crashes) before the computer system updates the disk with the data updates stored in the volatile cache memory, all update information stored in the volatile cache memory is deleted and typically irretrievable.

Thus, there remains a need to store transactional information in a manner that allows the information to be available following a computer system failure without having to perform the same transaction again. Additionally, there remains a need to have the transactional information available after a system failure in a more efficient manner than currently available.

SUMMARY OF THE INVENTION

An object of the invention is to ensure availability of transactional information following a failure of a computer system without having to perform the same transaction again. Additionally, another object of the invention is to provide availability to the transactional information following a system failure in a more efficient manner than currently available. The invention features a persistent volatile memory and an intermediary program in communication with the persistent volatile memory. The computer uses the intermediary program to enable the contents of the persistent volatile memory to remain unaltered during a failure of the computer.

In one aspect, the invention features a method for storing transactional information in a computer. The method comprises the steps of: (a) receiving transactional information; (b) storing the particular transactional information in a persistent volatile memory on the computer; and (c) retrieving the transactional information after a computer failure by accessing the transactional information stored in the persistent volatile memory on the computer.

Additionally, the method may also comprise flushing the persistent volatile memory to a persistent mass storage device. In one embodiment, the flushing occurs when the transactional information stored in the persistent volatile memory exceeds some predetermined threshold. In another embodiment, the flushing occurs when a predefined amount of time has elapsed since the storage of the transactional information in the persistent volatile memory. In yet another embodiment, the flushing occurs when a program, such as the operating system of the computer, is not busy. Alternatively, the flushing occurs when a file is closed or when the computer is shut down.

In another aspect, the invention features a method for providing persistent mass storage of transactional information. The method comprises the steps of: (a) receiving transactional information; (b) determining whether the transactional information meets a predetermined criteria; and (c) storing the transactional information that meets the predetermined criteria in a persistent cache. In one embodiment, the transactional information comprises unbuffered writes to disk, which are writes requested by an application and in which notification to the application of the completion of the write is necessary. For example, an unbuffered write can include copying a file from one directory to another directory, backing up and/or updating a file, and initializing a file.

In still another aspect, the invention features a persistent volatile memory and an intermediary program. The intermediary program receives transactional information and stores the transactional information in the persistent volatile memory. The contents of the persistent volatile memory remain unaltered through a system failure. In one embodiment, the intermediary program is a filter driver module that identifies particular transactional information to store in the persistent volatile memory. In another embodiment, the invention includes a flushing thread to flush the contents of the persistent volatile memory to a persistent non-volatile memory.

BRIEF DESCRIPTION OF THE DRAWINGS

The advantages of the invention described above, together with further advantages, may be better understood by referring to the following description taken in conjunction with the accompanying drawings. In the drawings, like reference characters generally refer to the same parts throughout the different views. Also, the drawings are not necessarily to scale, emphasis instead generally being placed upon illustrating the principles of the invention.

DETAILED DESCRIPTION OF THE INVENTION

Figure 1A:
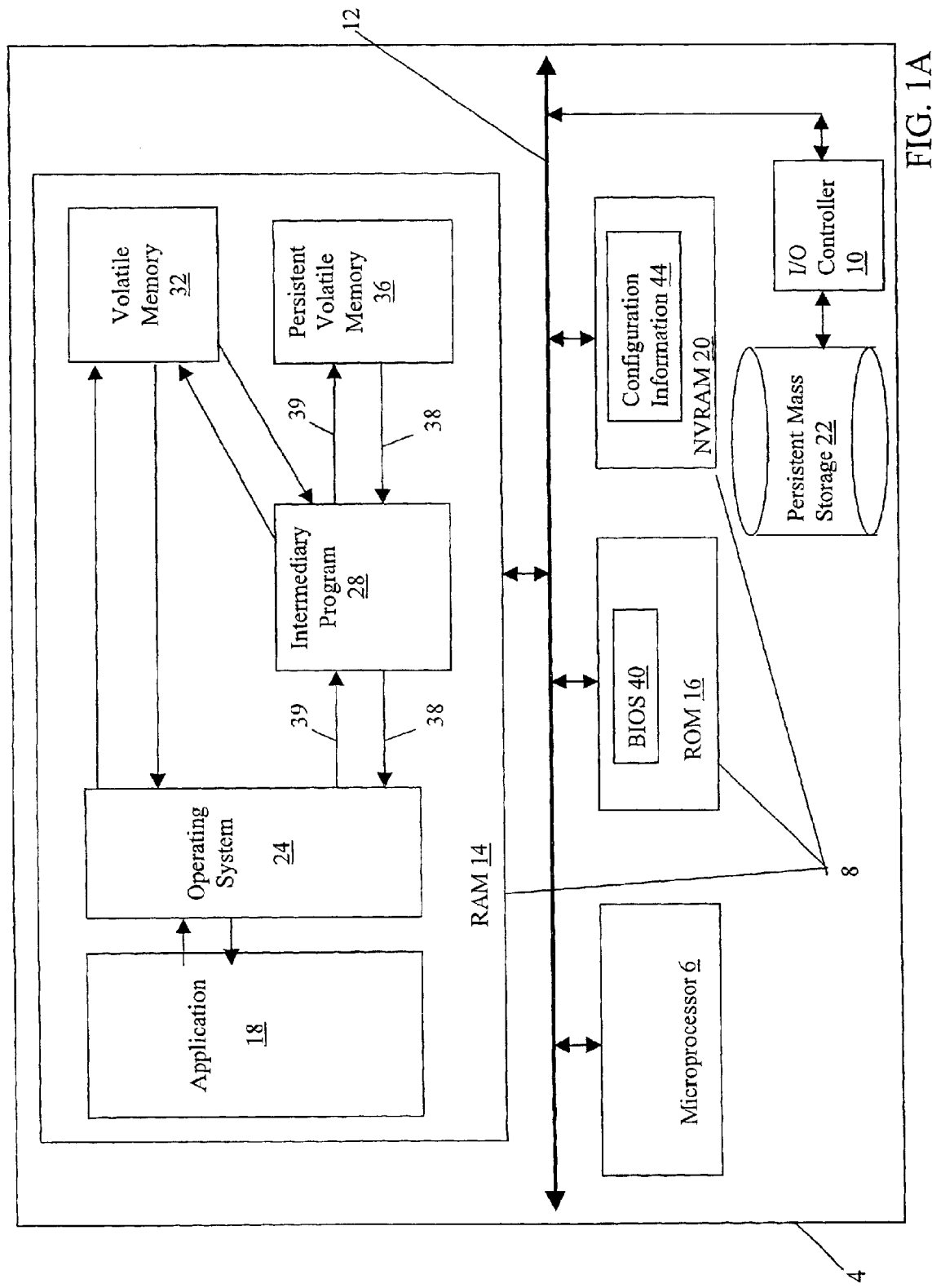
FIG. 1A is a block diagram of an embodiment of a computer constructed in accordance with the invention.

Referring to FIG. 1A, an embodiment of a computer 4 constructed in accordance with the invention is depicted. The computer 4 can be any personal computer (e.g., 286, 386, 486, Pentium, Pentium II, Macintosh computer), Windows™-based terminal (developed by Microsoft Corporation of Redmond, Wash.), Network Computer, wireless device, information appliance, RISC Power PC, X-device, workstation, mini computer, main frame computer, personal digital assistant, or other computing device that has a Windows™-based desktop and sufficient persistent mass storage.

The computer 4 includes a microprocessor 6, a memory 8 for storing programs and/or data, an input/output (I/O) controller 10, and a communications bus 12 allowing communication among these components. In one embodiment, the microprocessor 6 is a Pentium Classic/MMX CPU, developed by Intel Corporation of Austin, Tex., an AMD-K6 CPU, developed by AMD of Sunnyvale, Calif., and the like.

The computer 4 (i.e., the I/O controller 10) is additionally in communication with a persistent mass storage 22, such as a magnetic disk or magneto-optical drive. In one embodiment, the persistent mass storage 22 is an internal component of the computer 4. In another embodiment, a persistent mass storage 22' (not shown) is an external component of the computer 4. In particular, some computers 4 have redundant arrays of independent disks (RAID arrays) used as failure-tolerant persistent mass storage 22. The computer 4 can also be in communication with a peripheral device (not shown), such as a mouse, printer, alphanumeric keyboard, and display. In some embodiments, the computer 4 also includes a network connection.

The memory 8 in such a computer 4 typically includes random-access memory (RAM) 14, read-only memory (ROM) 16, and non-volatile random-access memory (NVRAM) 20. The RAM 14 typically contains one or more application programs 18 and an operating system 24. Examples of the OS include, but are not limited to, Windows NT developed by Microsoft Corporation of Redmond, Wash., OS/2 developed by IBM Corporation of Armonk, N.Y., Netware developed by Novell, Incorporated of San Jose, Calif., and the like. In addition, the RAM 14 includes one or more intermediary programs 28. In one embodiment and as described further below, an intermediary program 28 is a filter driver module that stores certain types of I/O transactional information in a persistent memory to ensure stability after a computer failure (e.g., from a computer crash).

In one embodiment, the RAM 14 is additionally partitioned into a volatile memory 32 and a persistent volatile memory 36. The volatile memory 32 is directly accessible to the operating system 24 and is typically initialized or modified during a boot cycle of the computer 4. The intermediary program 28 handles requests such as read request(s) 38 and/or write request(s) 39 from the operating system 24 which are directed to the persistent volatile memory 36. In one embodiment, the persistent volatile memory 36 is a persistent cache memory. In a further embodiment, the persistent volatile memory 36 includes a log file in persistent cache memory (i.e., log cache).

The ROM 16 includes a modified basic input-output system (BIOS) 40 that handles the boot process of the computer 4. The modified BIOS 40 prevents the operating system 24 from directly accessing the contents of the persistent volatile memory 36. The persistent volatile memory 36 is not directly accessible to the operating system 24 and therefore is not modified or initialized by the operating system 24 during a boot cycle. In one embodiment, configuration information 44 regarding the location and size of the persistent volatile memory component 42 is stored in an entry in NVRAM 20.

In general and during a normal boot operation of a typical computer system, a computer usually invokes a BIOS that provides low-level access to peripheral devices; identifies RAM available to the processor of the computer; initializes this RAM, typically destroying its contents; and then installs the operating system into RAM, giving the operating system access to the entire RAM to move information into and out of memory as necessary. If the computer is started after having been powered down, all of its memory will have been initialized.

In contrast and referring again to FIG. 1A, during a normal boot operation the computer 4 invokes the modified BIOS 40. The modified BIOS 40 retrieves configuration information 44 from NVRAM 20. This configuration information 44 includes the start address and the size of persistent volatile memory 36. The modified BIOS 40 then separates the RAM 14 into the volatile memory 32 and the persistent volatile memory 36. The BIOS 40 then initializes the volatile memory 32. The modified BIOS 40 provides low-level access to peripherals (not shown), installs the operating system 24 into the volatile memory 32 of RAM 14, and prevents the operating system 24 from directly accessing the persistent volatile memory 36 during the boot cycle and normal computer operation. The operating system 24 is, in effect, unaware of the persistent volatile memory 36. The operating system 24 then typically initializes or installs its own programs into the volatile memory 32, often modifying the contents of the volatile memory 32, but does not modify the contents of the persistent volatile memory 36. This renders the contents of the persistent volatile memory 36 constant through a boot cycle.

In one embodiment of the invention, the intermediary program 28 is aware of the persistent volatile memory 36 and is able to access its contents. After reading the configuration information 44, the intermediary program 28 serves as a link between the operating system 24 and the persistent volatile memory 36. The intermediary program 28 receives a read request 38 from the operating system 24 to access the persistent volatile memory 36 and returns information to the operating system 24 from the appropriate location in the persistent volatile memory 36. Similarly, the intermediary program 28 receives a write request 39 from the operating system 24 and stores information at the appropriate location in the persistent volatile memory 36.

For example, in one embodiment of the invention the operating system 24 is the Windows 2000 operating system. Under Windows 2000, the persistent volatile memory 36 accessible through the intermediary program 28 appears to the operating system 24 as a RAM disk, in contrast to the invention, although the contents of a normal RAM disk do not survive a boot cycle. A Windows 2000 read request 38 or write request 39 includes an offset value (in bytes) from the start of the persistent volatile memory 36 and a length value (in bytes) of the data to read or the data to write. The intermediary program 28 computes the appropriate location in the persistent volatile memory 36 by adding the offset value in the request to the start address of the persistent volatile memory 36. In one embodiment, the persistent volatile memory 36 includes 1 MB of configuration information at the beginning of the persistent volatile memory 36, so the appropriate location is actually the sum of the offset value, the start address of the persistent volatile memory 36, and 1 MB.

For a read request 38, the intermediary program 28 copies a number of bytes equal in size to the length value from the computed location in the persistent volatile memory 36 to the user's buffer. For a write request 39, the intermediary program 28 copies a number of bytes equal in size to the length value passed by the operating system 24 from the user's buffer to the computed location in the persistent volatile memory 36. This interaction permits the operating system 24 to indirectly access the persistent volatile memory 36 without threatening the integrity of the contents of the persistent volatile memory 36 during a boot cycle. In another embodiment where Windows 2000 is the operating system 24, the intermediary program 28 invokes the functionality of the operating system 24 to map the computed location onto the virtual address space of the operating system 24 for the copy operation. Other operating system 24 functionality completes the copy operation and unmaps the computed location from the virtual address space of the operating system 24.

It is possible for the operating system 24 to crash while a write request 39 to persistent volatile memory 36 is being executed. In that case, an incomplete version of the request would be stored in the persistent volatile memory 36. This can cause problems during subsequent operation, because a computer application may attempt to restore its state based on this incomplete information, potentially crashing the application and necessitating time-consuming reconstruction of the information lost during the crash.

To prevent this problem, the invention in one embodiment creates a table in the persistent volatile memory 36 and uses the table to describe the transactional information stored in the persistent volatile memory 36. In particular, the intermediary program 28 creates and maintains the table. The intermediary program 28 creates and initializes the table when the computer 4 loads the intermediary program 28. Examples of parameters that the table includes are, without limitation, a file descriptor, an offset into the file (i.e., a file byte location), a length value which indicates the number of bytes in the I/O request, a pointer that points to the location in the persistent volatile memory 36 at which the unbuffered write is stored, and a status field. The status field may include a free state that denotes that the location in the table is available to store information. The status field may also include a reserved state to denote that the intermediary program 28 is copying the transactional information to the persistent volatile memory 36. In yet another embodiment, the status field may include an in-use state to denote that the table entry contains valid information and is not available for storage of new information. Although several examples of the parameters included in the table are described above, it should be noted that the table may also include additional parameters not described.

Figure 1B:
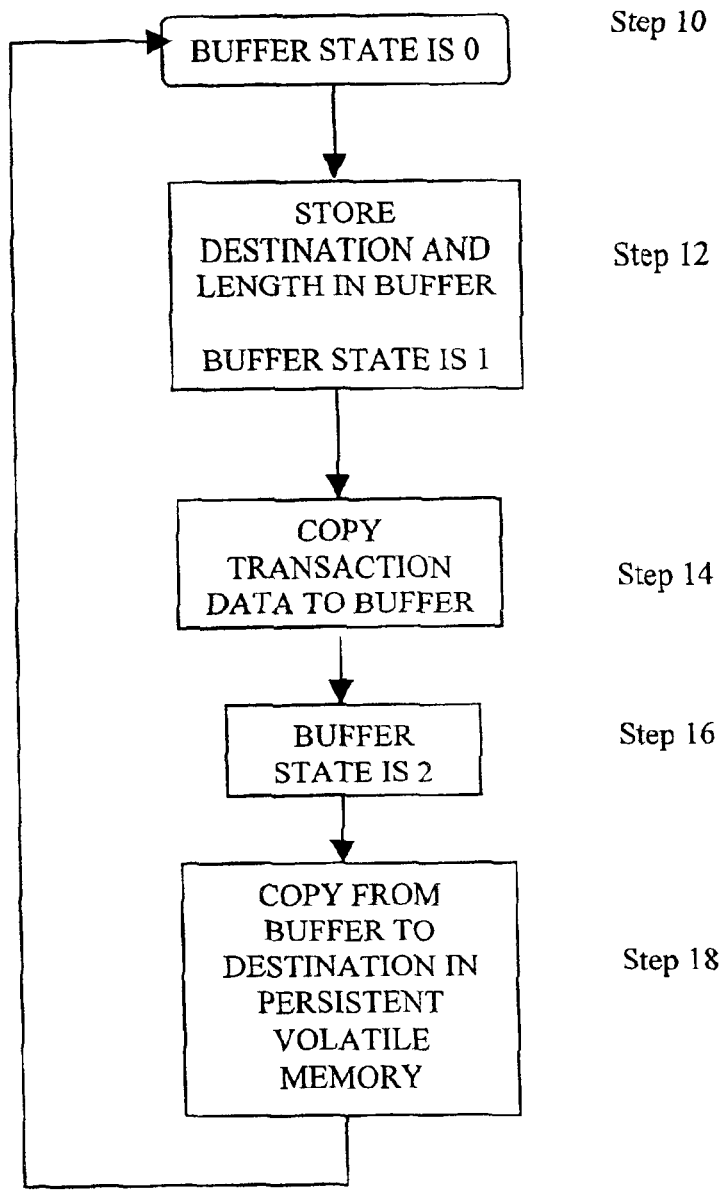
FIG. 1B is a flowchart depicting an embodiment of a process for writing a buffer atomically performed in accordance with the invention.

Alternatively, the invention creates look-aside buffer in the persistent volatile memory 36 and uses it for the atomic update and storage of transactional information; only when the write request 39 has been buffered and completed is it transferred out of the look-aside buffer. The intermediary program 28 may use the look-aside buffer to complete an unfinished write to the persistent volatile memory 36 (i.e., a computer failure before the write to the persistent volatile memory 36 completes). In greater detail, a look-aside buffer includes a set of bits that describe its state. FIG. 1B shows how the state of the look-aside buffer changes to reflect various stages in the processing of a write request 39.

When no information is in the buffer, for example at the creation and initialization of the buffer, the buffer state is 0 (Step 10). When a write request 39 is received by the intermediary program 28, the intermediary program 28 stores the computed location and the length (in bytes) of the request in the look-aside buffer and the state of the buffer becomes 1 (Step 12). At this point, the actual contents of the write request are copied into the buffer (Step 14). If the copy is successfully completed, the buffer state becomes 2 (Step 16). If the copy fails because of, for example, a system crash, the buffer state remains at 1. Once the buffer state is set to 2, the contents of the write request are copied out of the look-aside buffer to their computed location in the persistent volatile memory 36 (Step 18). When this is successfully completed, the buffer state returns to 0 (Step 10).

Figure 1C:
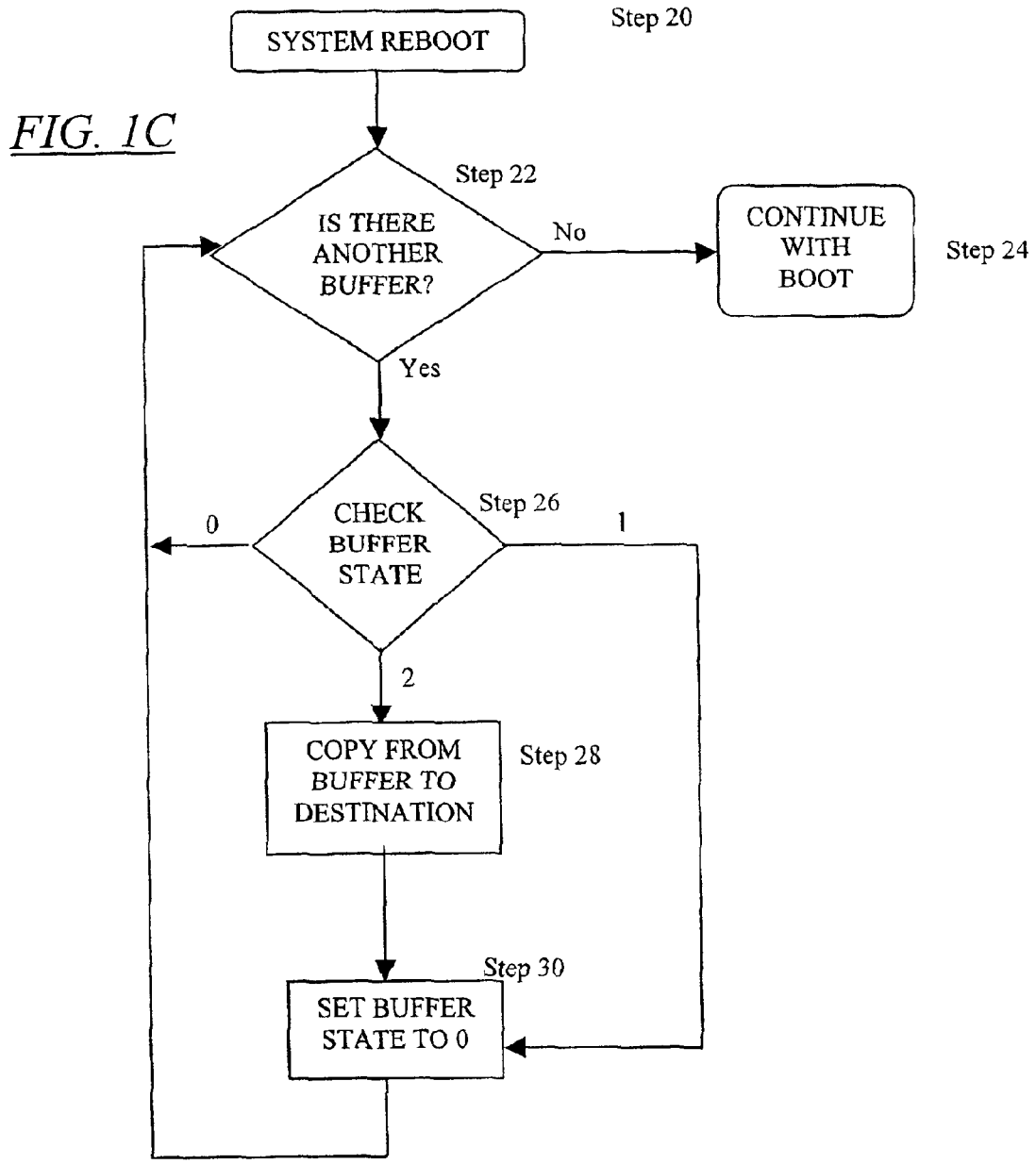
FIG. 1C is a flowchart depicting an embodiment of the steps for recovery of completed transactional information during a boot cycle performed in accordance with the invention.

The effect of the value of the state of the look-aside buffer on the subsequent boot process is depicted in FIG. 1C. At system reboot (Step 20), the intermediary program 28 locates all the look-aside buffers in the persistent volatile memory 36. If there are no more look-aside buffers to check (Step 22), the system boot process continues (Step 24). If there are more look-aside buffers (Step 22), the intermediary program 28 proceeds to examine the state of each look-aside buffer, one at a time, in the persistent volatile memory 36 (Step 26). If the state of the buffer presently under examination is 0, the intermediary program 28 knows that there is no information stored in the look-aside buffer and the intermediary program 28 checks the next look-aside buffer (Step 22). If the buffer state is 1, the intermediary program 28 knows that the information in the look-aside buffer is the result of an incomplete transaction and should not be moved into the persistent volatile memory 36 for recovery by a computer application. The intermediary program 28 sets the state of this buffer to 0 (Step 20) and checks the next look-aside buffer (Step 22). If the buffer under examination is in state 2, then the intermediary program 28 knows that the contents of the look-aside buffer are the result of a completed transaction that did not get copied into the persistent volatile memory 36. The intermediary program 28 copies the contents of the look-aside buffer to the computed location in the persistent volatile memory 36 (Step 28). When the copy is completed, the buffer state is set to 0 (Step 20) and the intermediary program 28 checks the next look-aside buffer (Step 22). Eventually the intermediary program 28 will have checked the state of all the look-aside buffers, and the system boot will continue (Step 24).

Although described above and below as a table or a buffer, it should be noted that any data structure can be used to provide information about the state of the transactional information that is stored in the persistent volatile memory 36.

Figure 1D:
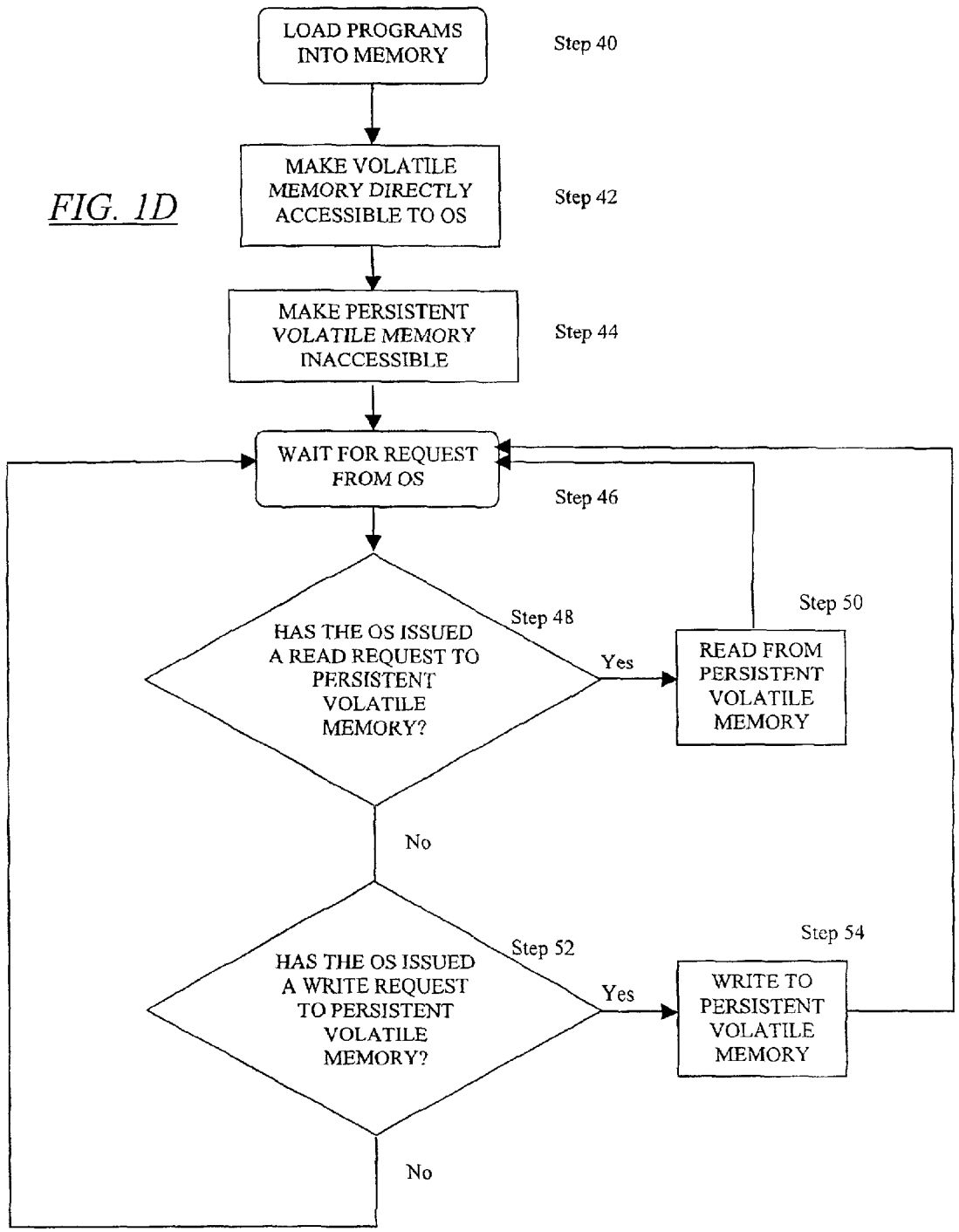
FIG. 1D is a flowchart depicting an embodiment of the operation of the computer shown in FIG. 1A.

Referring to FIG. 1D, during a boot cycle the computer 4 loads the programs implementing the invention into the memory 8 at Step 40. In one embodiment, the programs are the intermediary program 28 and the modified BIOS 40. The programs 28, 40 divide the RAM 14 into two portions: the volatile memory 32 directly accessible to the operating system 24 in Step 42 and the persistent volatile memory 36 that is not directly accessible to the operating system 24 in Step 44. This is accomplished through modifications to the BIOS 40. The inaccessibility to the operating system 24 renders the contents of the persistent volatile memory 36 resistant to initialization or modification during a boot cycle. Again, one skilled in the art will recognize that the invention permits multiple persistent and non-persistent memory regions, but for the sake of simplicity of discussion and depiction, the present discussion assumes one volatile memory 32 and one persistent volatile memory 36.

Once the memory partitioning has been achieved, the intermediary program 28 provides indirect access to the persistent volatile memory 36 to the operating system 24. In step 46, the intermediary program 28 waits for a read request 38 or a write request 39 from the operating system 24. The intermediary program 28 decides (Step 48) whether a read request has been received, and if one has, then the intermediary program reads (Step 50) from the appropriate location in the persistent volatile memory 36 and returns the result to the operating system 24. Similarly, if the intermediary program 28 decides (Step 52) that a write request 39 has been received, then the intermediary program 28 stores (Step 54) information at the appropriate location in the persistent volatile memory 36. If neither type of request has been received, then the intermediary program 28 returns to step 46 and continues to wait for requests. Typically, read and write requests from the operating system 24 to the volatile memory 32 operate as they would have before the installation of the invention.

An example of the intermediary program 28 is a filter driver module. The filter driver module 28 stores certain types of I/O transactional information in the persistent volatile memory 36 so that the information does not get erased during a computer crash. Thus, following a crash of the computer 4, the application program 18 still recognizes what the application program 18 had done just prior to the computer crash.

In one embodiment, the transactional information are unbuffered writes (i.e., writes requested by the application 18 and in which notification to the application 18 of the completion of the write is necessary) to the persistent mass storage 22. Examples of an unbuffered write include, without limitation, copying a file from one directory to another directory, backing up and/or updating a file, initializing a file (e.g., writing zeros to the file), and the like. Although described above and below with transactional information, any information can be used within the scope of the invention.

For example, the application 18 can be a database management system (DBMS) that verifies all updates to files before that file can be made available again to the application 18. It should be noted that a request to access the file for a read or write transaction can be from a different query from the same application or can be from a different application altogether.

In general and during a normal unbuffered write of transactional information, an application program executing on a computer typically writes transactional information to disk and the operating system of the computer transmits a confirmation message to the application when the write completes. If the application program does not receive a confirmation message after a predetermined time, the application often performs the previous write to disk again and subsequently waits for another confirmation message. This process is generally wasteful and decreases the performance of the application program.

In the invention described above and below, the application 18 generates a write to the persistent mass storage 22 (e.g., disk). The operating system 24 instead uses the filter driver module 28 and writes the information to the persistent volatile memory 36. Following the completion of this write to the persistent volatile memory 36, the operating system 24 transmits the confirmation to the application 18. The application 18 receives the confirmation soon after the generation of the write, as a write to memory (e.g., persistent volatile memory 36) is faster than a write to the persistent mass storage 22. Therefore, in one embodiment the application 18 receives the confirmation from the operating system 24 before the transactional information is stored in the persistent mass storage 22.

The filter driver module 28 may be a passive filter or an active filter. A passive filter is a filter that monitors the information that the filter driver module 28 stores in the persistent volatile memory 36. For example, the computer 4 configures the passive filter driver module 28 to monitor all unbuffered writes requested by a particular application 18, such as by a DBMS. This may be used to help determine performance decreases associated with multiple unbuffered writes by a particular application 18.

As an active filter, the filter driver module 28 receives an instruction to store in the persistent volatile memory 36 and performs some modification on the instruction before storing the instruction. For example, the active filter driver module 28 may receive a certain type of transactional information, such as an unbuffered write to initialize a file by writing zeros to the file. The active filter driver module 28 may alter the unbuffered write to write ones to the file if the operating system 24 determines the writing of ones to be necessary for initialization. In a further embodiment, the filter driver module 28 is created by a file systems filter driver kit (FDDK), developed by Open Systems Resources, Incorporated of Amherst, N.H.

Figure 2A:
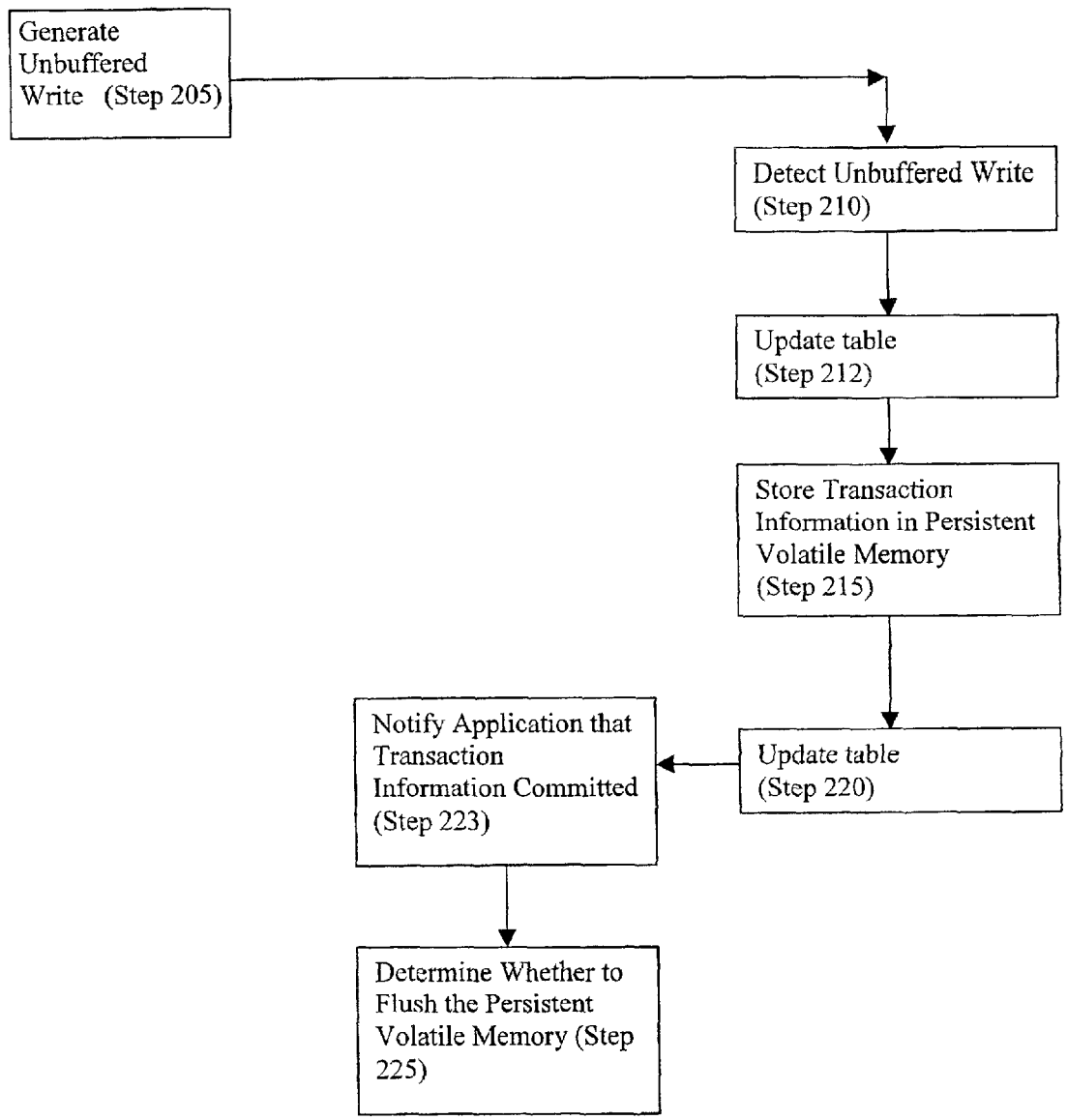
FIG. 2A is a flowchart depicting an embodiment of the operation of the computer of FIG. 1A to store unbuffered writes in persistent memory.

Referring to FIG. 2A, a logical flow chart depicts the operation of the computer 4 on unbuffered writes. The application 18 generates (step 205) an unbuffered write and the filter driver module 28 detects (step 210) the unbuffered write. After detecting the unbuffered writes, the filter driver module 28 updates (step 212) the table described above with information associated with the unbuffered write. For example, the filter driver module 28 updates the status field to a reserved state to denote that the detected unbuffered write is about to be copied to the persistent volatile memory 36.

After updating the table, the filter driver module 28 stores (step 215) the transactional information in the persistent volatile memory 36. In another embodiment, all writes (unbuffered writes and buffered writes) are stored in the persistent volatile memory 36. In yet another embodiment, the filter driver module 28 stores the transactional information in volatile memory 32, makes a copy of the transactional information stored in the volatile memory 32, and then transfers the copy into the persistent volatile memory 36.

In one embodiment and as further described below, the operating system 24 additionally starts a timer to enable future recordation of the time elapsed from the transferring of the transactional information to the persistent volatile memory 36. In another embodiment, the operating system 24 stores the time read from a predetermined register located in the computer 4.

The filter driver module 28 then updates (step 220) the table to denote that the transfer of the transactional information to the persistent volatile memory 36 is complete. In particular and in one embodiment, the filter driver module 28 updates the status field associated with the particular transactional information to an in-use state. Thus, if a failure of the computer 4 occurs prior to the completion of a transmittal of transactional information to the persistent volatile memory 36, the filter driver module 28 can determine that the transmittal of particular session information did not complete prior to the computer failure (i.e., the status field associated with the transactional information will not be set to an in-use state). If the filter driver module 28 determines that the transactional information was not transmitted to the persistent volatile memory 36, then the filter driver module 28 repeats step 215 to store the transactional information in the persistent volatile memory.

The operating system 24 then notifies (step 223) the application 18 that the transactional information has been stored in the persistent volatile memory 36. In one embodiment, the notification occurs as a confirmation message to the application. The operating system 24 then determines (step 225) whether the operating system 24 should flush, or transfer, the persistent volatile memory 36 to the persistent mass storage 22. In one embodiment, the filter driver module 28 includes a thread responsible for flushing the persistent volatile memory 36 to the persistent mass storage 22. As described further below, the thread can flush the persistent volatile memory 36 when a particular event occurs, such as when the operating system 24 transmits a message to the filter driver module 28 instructing the filter driver module 28 to flush the persistent volatile memory 36. In another embodiment, the thread may poll the persistent volatile memory 36 to determine whether the data stored in the persistent volatile memory should be flushed.

Figure 2B:
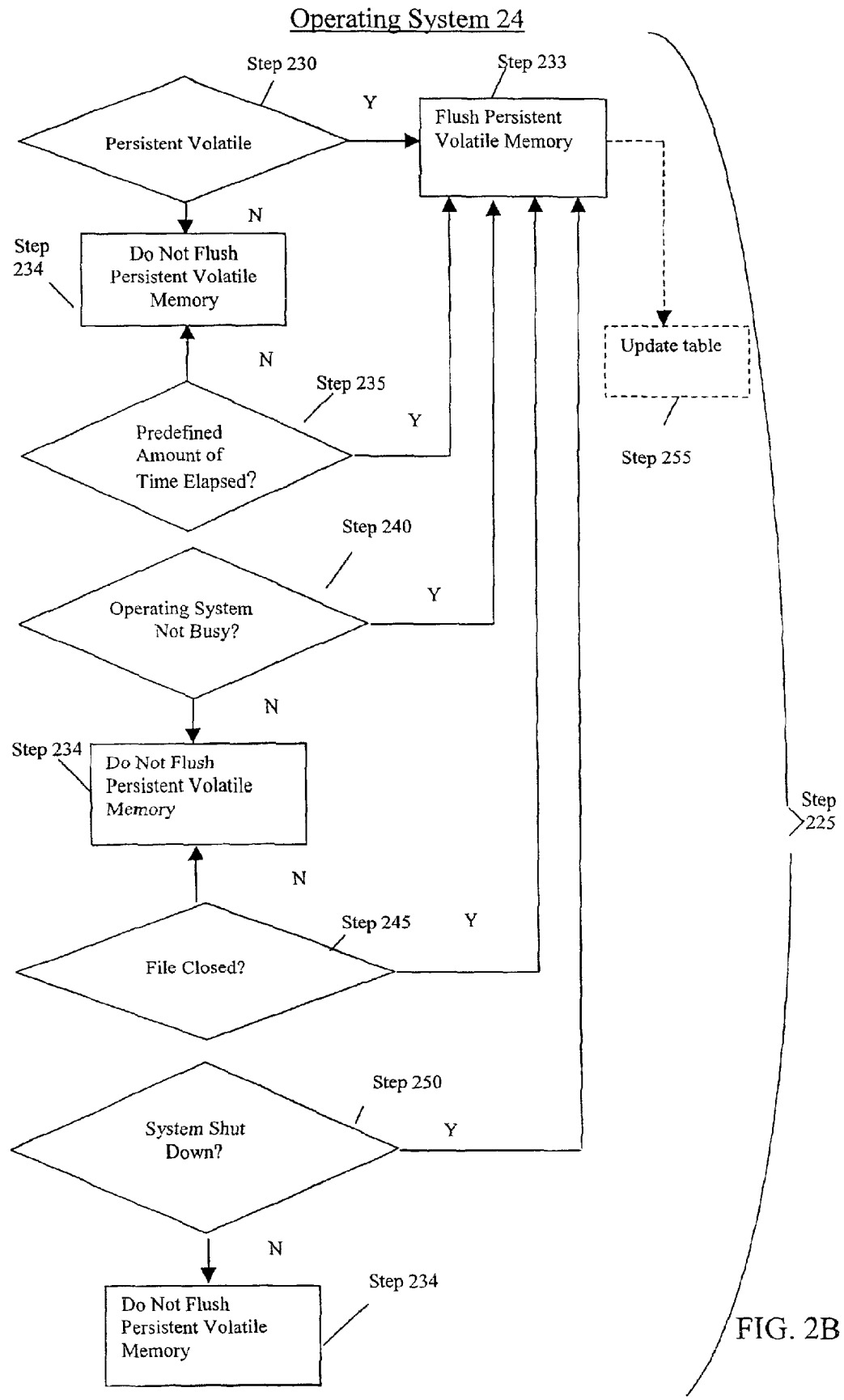
FIG. 2B is a flowchart depicting an embodiment of the steps of flushing persistent memory as shown in FIG. 2A.

FIG. 2B illustrates an embodiment of the steps performed by the operating system 24 to determine (step 225) whether the operating system 24 should flush the persistent volatile memory 36 to the persistent mass storage 22. In one embodiment, the operating system 24 determines (step 230) whether the data stored in the persistent volatile memory 36 exceeds or is about to exceed some predetermined threshold (e.g., the allotted size of the persistent volatile memory 36). If so, the operating system 24 flushes (step 233) the persistent volatile memory 36 to the persistent mass storage 22. If not, the operating system 24 does not flush (step 234) the persistent volatile memory 36. The operating system 24 can also flush (step 235) the persistent volatile memory 36 if the operating system 24 determines (step 235) that a predefined amount of time since the transferring of the transactional information has elapsed. In some embodiments, the operating system 24 uses the timer described above to make this determination. In another embodiment, the operating system 24 records the current time stored in the register described above. Using this recorded time and the previously recorded time, the operating system 24 determines the amount of time that has elapsed since the transferring the transactional information to the persistent volatile memory 36. If the elapsed time is greater than a predefined amount of time, the operating system 24 flushes (step 233) the persistent volatile memory 36.

In another embodiment, the operating system 24 determines (step 240) to flush the persistent volatile memory 36 when the operating system 24 is not servicing the application 18 (i.e., the operating system is not busy). For example, the operating system 24 flushes the persistent volatile memory 36 when the application 18 is idle.

Alternatively, the operating system 24 determines (step 245) whether the application 18 requests to write the transactional information to a file that has previously been closed. In one embodiment, the application 28 transmits a message to the operating system 24 when the application 28 closes. If so, the operating system 24 flushes (step 233) the persistent volatile memory 36. The operating system 24 additionally flushes (step 233) the persistent volatile memory 233 when the computer 4 is in the process of being (step 250) shut down. In one embodiment, the filter driver module 28 additionally updates (step 255) the table to denote that the transactional information has been stored in the persistent mass storage 22.

By storing the transactional information in a persistent volatile memory 36, the information is accessible to the computer 4 at any instant in time. Therefore, a retrieval of such information does not significantly hamper the performance of the computer 4. Additionally, the persistent volatile memory 36 (and the persistent mass storage 22) enable the session information to be accessible to the computer 4 after a computer failure, which would ordinarily erase the information from a volatile memory.

As an example and referring again to FIG. 2A, suppose the transaction is a catalog merchandise order phoned in by a customer and entered into the computer 4 by a customer representative. The customer enters the order into an application 18 associated with the catalog and the application 18 generates (step 205) the writes to a database file that should occur for the order. In particular, the order transaction involves checking an inventory database file, confirming that the item is available, placing the order and confirming that the order has been placed. Considering these steps as a single transaction, then all of the steps are to be completed before the transaction is successful and the inventory database file is actually changed to reflect the new order.

In greater detail, the application 18 associated with the catalog checks the inventory database file and confirms that the item is available. If the item is available, the application 18 places the order. In some prior art computer systems, the application 18 stores the transactional information in RAM 14 so that the application 18 (e.g., the DBMS) can commit the information to persistent mass storage 22 at a later time. If the computer 4 failures (e.g., crashes) at this point in time, the order would have been placed, but the information previously stored in RAM 14 is erased. Consequently, the transactional information has not been reflected in the inventory database file and, therefore, to retrieve this information to update the inventory database file, the application 18 frequently has to repeat the transaction again.

Unlike the above scenario, the invention uses the filter driver module 28 to determine (step 210) that the transaction involves an unbuffered write to the inventory database file. The filter driver module 28 then stores (step 215) the transactional information to the persistent volatile memory 36 so that the transactional information can survive a crash of the computer 4. Thus, if the failure of the computer 4 occurs, the transactional information has already been stored in the persistent volatile memory 36. The operating system 24 notifies (step 223) the application 18 of the completion of the write and consequently determines (step 225) whether to flush the persistent volatile memory 36, as described above.

Having described certain embodiments of the invention, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. In a computer comprising a volatile memory partitioned into a first, contiguous, non-persistent memory region directly accessible by an operating system running on the computer; and a second contiguous persistent memory region not directly accessible by the operating system, a method for providing persistent of transactional information, the method comprising the steps of:
   (a) receiving transactional information;
   (b) determining that the received transactional information meets a predetermined criteria; and
   (c) storing the received transactional information meeting the predetermined criteria in the second, persistent memory region.

2. The method of claim 1 wherein the transactional information meeting the predetermined criteria comprises unbuffered writes to disk.

3. The method of claim 1 wherein the transactional information meeting the predetermined criteria comprises one of the group consisting of a file copy, a file backup, a file update, and a file initialization.

4. A computer for committing transactional information, the computer comprising:
   (a) a volatile memory partitioned into a first, contiguous, non-persistent memory region directly accessible by the operating system and initialized during a boot cycle, and a second, contiguous persistent memory region not directly accessible by the operating system and not initialized during a boot cycle;
   (b) an intermediary program in communication with the second, contiguous persistent memory region, the intermediary program receiving transactional information and storing the received transactional information in the second, contiguous persistent memory, wherein the contents of the second contiguous persistent memory region remain unaltered through a system boot cycle.

5. A method for storing transactional in a computer system, the computer system comprising a volatile memory element and an operating system, the method comprising the steps of:
   (a) partitioning the volatile memory element into a first contiguous, non-persistent memory region directly accessible by the operating system and a second, contiguous persistent memory region not directly accessible by the operating system;
   (b) receiving, by the computer system, transacitional information;
   (c) storing the received transactional information in the second, contiguous persistent memory region; and
   (d) retrieving, by the computer system, the stored transactional information from the second, contiguous persistent memory region after a computer failure.

6. The method of claim 5 further comprising, before step (d), identifying for retrieval particular transactional information stored in the second, contiguous persistent memory region.

7. The method of claim 5 further comprising flushing the second, contiguous persistent memory region to a mass storage device.

8. The method of claim 7 further comprising, before said flushing step, determining that the transactional information stored in the second, contiguous persistent memory region exceeds a predetermined threshold.

9. The method of claim 7 further comprising, before said flushing step, determining that a predefined amount of time has elapsed.

10. The method of claim 7 further comprising, before said flushing step, determining that a program is idle.

11. The method of claim 10 wherein the program is an operating system controlling the computer.

12. The method of claim 7 further comprising determining, before the flushing step, that a file is closed.

13. The method of claim 7 further comprising determining, before said flushing step, that the computer is being shut down.

14. The method of claim 5 further comprising making a copy of the received transactional information.

15. The method of claim 14 further comprising storing the copy of the received transactional information in the second, contiguous persistent memory region.

16. The computer of claim 4 further comprising a filter driver module to identify particular transactional information from among the received transactional information for storage in the second, contiguous persistent memory region.

17. The computer of claim 16 further comprising storing the identified particular transactional information in the second, contiguous persistent memory region.

18. The computer of claim 4 wherein the second, contiguous persistent memory region further comprises a persistent cache.

19. The computer of claim 18, wherein the computer flushes the contents of the persistent cache to the second contiguous persistent memory region.

20. The computer of claim 18 further comprising a flushing thread to flush the contents of the persistent cache.

21. The computer of claim 4 wherein the identified, particular transactional information comprises unbuffered writes to disk.

22. The computer of claim 4 wherein the identified, particular transactional information comprises one of the group consisting of a file copy, a file backup, a file update, and a file initialization.

23. The computer of claim 4 further comprising a data structure to describe the state of the identified, particular transactional information stored in the second, contiguous persistent memory region.

* * * * *